United States Patent [19]
Hopper

[11] 3,880,816
[45] Apr. 29, 1975

[54] UNSYMMETRICAL DISULFIDES AS PREMATURE VULCANIZATION INHIBITORS

[75] Inventor: Roger J. Hopper, Akron, Ohio

[73] Assignee: The Goodyear Tire & Rubber Company, Akron, Ohio

[22] Filed: July 2, 1973

[21] Appl. No.: 375,590

[52] U.S. Cl........ 260/79.5 B; 260/79.5 A; 260/453; 260/780
[51] Int. Cl.......................... C08c 11/54; C08d 9/00
[58] Field of Search..... 260/79.5 R, 79.5 A, 79.5 B, 260/780

[56] References Cited
UNITED STATES PATENTS
3,703,500  2/1972  Nast............................... 260/79.5 B OTHER PUBLICATIONS
Chem. Abst., 57, 15314c.

Primary Examiner—Christopher A. Henderson
Attorney, Agent, or Firm—F. W. Brunner; J. A. Rozmajzl

[57] ABSTRACT

Retarders such as n-propyl-trichloromethyl disulfide and α,α'-di(trichloromethyldithio)-p-xylene are used to improve or maintain scorch resistance in sulfur vulcanizable polymers.

11 Claims, No Drawings

UNSYMMETRICAL DISULFIDES AS PREMATURE VULCANIZATION INHIBITORS

This invention relates to an improved vulcanizing process for rubber and to the rubber stocks obtained by using this improved process. The invention relates to improved accelerator-inhibitor combinations for rubber. The invention also relates to new compounds useful as inhibitors of premature vulcanization in rubber. More particularly the invention relates to a method for preventing the premature vulcanization of rubber stocks and to the rubber stocks obtained by using this method.

Scorching during the processing of rubber is due to the premature or incipient vulcanization which may occur during any of the steps involved in the processing prior to the final vulcanization step, or during storage between said processing steps. Whereas a properly compounded unscorched rubber formulation can be die-extruded or sheeted from a calendar smoothly and without lumping, a scorched material often becomes wavy and lumpy after extrusion or sheeting, and must be discarded.

An object of the present invention is to provide a method of inhibiting premature vulcanization of rubber. Another object of the present invention is to provide scorch inhibitors and retarders for use in rubber processing. Other objects will become apparent as the description proceeds.

According to the present invention there is provided a method of inhibiting premature vulcanization of rubber containing a vulcanizing agent and an organic vulcanization accelerating agent which comprises incorporating therein in an amount effective to inhibit premature vulcanization, a compound selected from the group of retarders having the following structural formulae:

$$RSSCCl_3 \quad (I)$$

and $$Cl_3CSSR^1SSCCl_3 \quad (II)$$

wherein R is a radical selected from the group consisting of alkyl (1 to 20 carbon atoms), cycloalkyl (5 to 20 carbon atoms) including alkyl substituted cycloalkyls, aralkyl (7 to 20 carbon atoms), aryl (6 to 20 carbon atoms), and alkylaryl (7 to 20 carbon atoms). The aralkyl, aryl, and alkylaryl radicals include those having 1 or 2 chloro, nitro, or alkoxy substituents on the aromatic ring. $R^1$ is an unsubstituted or mono ar-chloro substituted o, m, or pxylylene radical, or an acyclic divalent hydrocarbon radical (3 to 20 carbon atoms), or a cyclic divalent hydrocarbon radical (5 to 20 carbon atoms) on which the valencies may or may not be attached to the ring itself, and wherein the valencies on both the acyclic and cyclic radicals are separated by at least one carbon atom.

More preferably R is selected from alkyl radicals having 2 to 19 carbon atoms, such as ethyl, and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, and nonadecyl, the cycloalkyl radicals cyclopentyl, cyclohexyl, and cyclooctyl, the aralkyl radicals benzyl, o-, m-, and p-methylbenzyl, o-, m-, and p-chlorobenzyl, and o-, m-, and p-nitrobenzyl, the alkaryl radicals o-, m-, and p-tolyl, and the aryl radicals phenyl, p-chlorophenyl, and p-nitrophenyl.

Most preferably R is selected from the group consisting of benzyl, o-methylbenzyl, m-methylbenzyl, p-methylbenzyl, o-chlorobenzyl, m-chlorobenzyl, p-chlorobenzyl, o-nitrobenzyl, m-nitrobenzyl, p-nitrobenzyl, otolyl, m-tolyl, p-tolyl, phenyl and p-chlorophenyl, and primary alkyl radicals having the structure $-CH_2-R^2$, wherein $R^2$ is a saturated straight chain or branched aliphatic hydrocarbon group of 1 to 18 carbon atoms. Representative of the most preferred primary alkyl radicals are 2-methylpropyl, 2-ethylhexyl, primary tridecyl radicals and n-alkyl radicals of 2 to 19 carbon atoms. A mixture of trichloromethyl disulfides prepared from a commercial mixture of primary tridecyl mercaptans were outstanding. Members within the above group are generally the more effective inhibitors. Those with higher molecular weights, derived from less odorous mercaptans, are preferred.

Preferably $R^1$ is selected from p-xylylene or the cyclic radicals 1,4-cyclohexylene, p-menthanedi-2,9-yl or 2- and 4-ethylenecyclohexyl or divalent radicals having the following structural formula $-CH_2-R^3-CH_2-$ wherein $R^3$ is a saturated straight chain or branched chain aliphatic hydrocarbon group having 1 to 10 carbon atoms.

Methods for the preparation of the retarders of this invention have been described in the following prior art.

U.S. Patent 2,553,777 5/22/51 R. S. Hawley and A. R. Kittleson

U.S. Patent 2,326,102 8/3/43 E. M. Nygaard and J. H. McCracken

E. German Patent 19,932 9/13/60

H. J. Backer and E. Westerhuis, Rec. Trav. Chim., 71, 1065 (1952)

V. Rabl, J. Cizek, and J. Mostecky, Sb. Vys. Sk. Chem.-Technol. Praze, Technol. Paliv 9, 21 (1966); Chem. Abstr., 66, 779962 (1967)

Perchloromethyl mercaptan is added to an essentially equimolar amount of alkyl or aryl mercaptan in the presence or absence of a solvent. Solvents include ether, alcohol, and benzene. In the absence of an acid acceptor, gaseous HCl is evolved according to the equation, $$Cl_3CSCl + RSH \rightarrow Cl_3CSSR + HCl \uparrow.$$

Alternatively, alkali metal alkoxides or hydroxides can be used as acid acceptors, in which cases the alkali metal chlorides are formed as by-products. Similarly, an alkali metal mercaptide may be used in place of the free alkyl or aryl mercaptan. These techniques are reported to be applicable for preparation of di- and polyfunctional derivatives. An additional technique involves the reaction of perchloromethyl mercaptan with $RSM_aX$, $RSM_aX$ being prepared by reaction of Grignard reagents with sulfur.

In the cited prior art, some of the compounds of this invention have been described as petroleum additives and parasiticidal compositions.

The following compounds are intended to illustrate but not to limit the retarders of the present invention.

n-Propyl-trichloromethyl disulfide
n-Butyl-trichloromethyl disulfide

Isopropyl-trichloromethyl disulfide
t-Butyl-trichloromethyl disulfide
n-Octyl-trichloromethyl disulfide
n-Dodecyl-trichloromethyl disulfide
(Primary tridecyl)-trichloromethyl disulfides
Cyclohexyl-trichloromethyl disulfide
Benzyl-trichloromethyl disulfide
p-Methylbenzyl-trichloromethyl disulfide
p-Chlorobenzyl-trichloromethyl disulfide
Phenyl-trichloromethyl disulfide
m-Tolyl-trichloromethyl disulfide
p-Chlorophenyl-trichloromethyl disulfide
p-Nitrophenyl-trichloromethyl disulfide
n-Decyl-trichloromethyl disulfide
n-Octadecyl-trichloromethyl disulfide
2-Ethylhexyl-trichloromethyl disulfide
o-Nitrobenzyl-trichloromethyl disulfide
n-Undecyl-trichloromethyl disulfide
1,4-Di(trichloromethyldithio) butane
1,8-Di(trichloromethyldithio) octane
1,4-Di(trichloromethyldithio) cyclohexane
α,α'-Di(trichloromethyldithio)-p-xylene
2,9-Di(trichloromethyldithio)-p-menthane
4-(β-trichloromethyldithioethyl)-trichloromethyldithiocyclohexane This invention is applicable to rubber mixes containing sulfur-vulcanizing agents, organic accelerators for vulcanization and antidegradants, neither being the inhibitor used. For the purposes of this invention, sulfur-vulcanizing agent means elemental sulfur or sulfur donating vulcanizing agents, for example, an amine disulfide or a polymeric polysulfide. The invention is applicable to vulcanization accelerators of various classes. For example, rubber mixes containing the aromatic thiazole accelerators which include N-cyclohexyl-2-benzothiazole sulfenamide, 2,2'-dithiobis(benzothiazole), 2-mercaptobenzothiazole, N-tert-butyl-2-benzothiazole sulfenamide, 2-benzothiazolyl diethyldithiocarbamate and 2-(morpholinothio) benzothiazole can be used. Other thiazole accelerators which may be used include 2-(aminodithio)-thiazoles and 2-(aminotrithio)thiazoles such as 2-(morpholinodithio)-benzothiazole. Amine salts of mercaptobenzothiazole accelerators for example, the t-butyl amine salt of mercaptobenzothiazole, and like salts of morpholine and 2,6-dimethyl morpholine can be used in the invention. Thiazole accelerators other than aromatic can be used. Stocks containing secondary accelerators for example tetraalkylthiuram disulfides or monosulfides such as tetramethylthiuram disulfide, and tetramethylthiuram monosulfide, salts of dithiocarbamic acids such as dialkyldithiocarbamic acids, for example zinc dimethyldithio carbamate, thiocarbamylsulfenamides, and guanidine derivatives such as diaryl guanidines, such as diphenyl guanidine or di-o-tolyl guanidine are improved using the process of our invention.

The inhibitors of the invention can be used in any sulfur vulcanizable rubber including natural rubber, synthetic rubbers and mixtures thereof. Synthetic rubbers that can profit by the practice of the present invention include butyl rubber, homopolymers of conjugated 1,3-diene monomer such as 1,3-butadiene or isoprene, e.g., cis-1,4 polybutadiene (a cis-1,4 content in excess of 30 percent, preferably in excess of 85 percent) and cis-1,4 polyisoprene (a cis-1,4 content in excess of 80 percent), copolymers of conjugated 1,3-diene monomer with other monomers, for example, styrene, acrylonitrile, isobutylene and methyl methacrylate. Ethylene propylene terpolymer, for example, ethylene, propylene dicyclopentadiene terpolymers can also benefit from the present invention. The invention is of particular value with reference to the diene rubbers and the term "rubber" is used herein to include both diene rubber and other rubbers. Best results are obtained with natural rubber, synthetic cis-1,4 polyisoprene and blends containing these rubbers.

The following Examples 1 to 3 illustrate the preparation of retarders which may be used within the practice of the present invention. Subsequent examples illustrate the use of retarders of this invention. These examples illustrate, but do not limit, the practice of the present invention.

EXAMPLE 1

To prepare n-dodecyl-trichloromethyl disulfide, 27.9 grams (0.15 mol) of perchloromethyl mercaptan was added with stirring to 33.4 grams (0.165 mol) 1-dodecane thiol in a 100 milliliter 3-necked flask. The perchloromethyl mercaptan was added dropwise over a period of 10 minutes. During the addition, the temperature in the flask was allowed to spontaneously rise from 22° C. to 55° C., then controlled at 55° C. to 57° C. by means of a cooling bath. Throughout the addition and subsequent reaction time, a stream of nitrogen was introduced below the surface of the liquid in the flask to facilitate removal of hydrogen chloride. When the perchloromethyl mercaptan addition was complete, the solution was stirred ten minutes while allowing the temperature to drop to 40° C. The nitrogen inlet tube was then replaced with a capillary tube, and the solution heated to 60° C. at 22 millimeters pressure for two hours, while bleeding nitrogen through the capillary. After standing overnight at ambient temperature and pressure heating to 60° C. at 22 millimeters pressure was resumed for one hour. The resulting pale yellow liquid (54 grams) was stirred with a 0.5 gram calcium carbonate for fifteen minutes and filtered. The product, 89 to 95 weight percent $CH_3(CH_2)_{11}SSCCl_3$ by gas chromatographic analysis, may be used without further purification, or may be purified by distillation under reduced pressure. A substantially pure fraction is collected at 145° C. to 150° C. and 0.06 to 0.07 millimeter pressure.

EXAMPLE 2

To prepare (mixed primary tridecyl)-trichloromethyl disulfide, essentially the same procedure is used as described in the above example. In this case, 36 grams of mixed primary tridecyl mercaptan ("PTM", manufactured by Pennwalt Corp.) is used in place of 1-dodecanethiol. The product is used without purification by distillation.

EXAMPLE 3

To prepare α, α'-di(trichloromethyldithio)-p-xylene, 18.5 grams (.1m) perchloromethyl mercaptan was added to a solution of 9 grams (.053m) p-xylene,α,α''-dithiol in 30 milliliters of benzene. The addition was carried out over a period of 5 minutes, allowing the temperature to spontaneously rise from ambient to 48° C. The resulting yellow solution was stirred 15 minutes without heating, then heated to reflux for 3 hours. Removal of benzene under reduced pressure yielded 23.5 grams (essentially quantitative) of off-white solid. Recrystallization from benzene, followed by washing with petroleum ether gave a pure white solid, melting point 94° C. to 97° C. An analytical sample (melting point 95° C. to 97° C.) was prepared by a second recrystallization from benzene. Calculated for $C_{10}H_8Cl_6S_4$ : 25.60% carbon, 1.72 percent hydrogen, 45.34 percent chlorine, 27.34 percent sulfur. Found: 25.50 percent carbon, 2.08 percent hydrogen, 45.22 percent chlorine, 27.27 percent sulfur.

The other compounds included within the practice of the present invention can be prepared by using the same or similar techniques as described in the preceding working examples. Synthetic routes to these compounds are not limited however to these particular reactions and procedures.

As illustrated by Example 2, the mercaptan, RSH, need not be a single compound. In fact, lower cost, commercially available mercaptan mixtures may be used to provide mixed products which retain their efficiency as retarders and are economically advantageous. Likewise, mixtures of difunctional mercaptans, $HSR^1SH$, may be used to prepare retarders within the scope of this invention.

Table I describes Basic Stocks A, B, and C which were compounded further with accelerator and retarder systems, as described subsequently herein, and tested.

Table I

| Component, phr | Compositions of Base Stocks | | |
|---|---|---|---|
| | A | Base Stock B | C |
| Natural rubber | 100.0 | — | 10.0 |
| SBR 1712 | — | 137.5 | — |
| Cis-1,4 polybutadiene | — | — | 90.0 |
| HAF black | 50.0 | — | — |
| ISAF black | — | 68.0 | 50.0 |
| Processing oil | 3.0 | — | 10.0 |
| Arylenediamine antioxidant | 1.0 | 1.5 | 1.0 |
| Stearic acid | 3.0 | 2.0 | 3.0 |
| Zinc oxide | 3.0 | 5.0 | 3.0 |
| Sulfur | 2.5 | 2.0 | 2.5 |

Tables II, III and IV illustrate the use of the retarders with a variety of rubber stocks and accelerator systems. The compositions are intended only to be illustrative of the practice of the present invention and not limiting. Unless otherwise indicated, all parts are parts by weight.

Data on scorch delay vulcanizing characteristics were obtained with a Monsanto Oscillating Disc Rheometer, according to ASTM method D 2084-71T ("1972 Annual Book of ASTM Standard", part 28, page 919). Operating parameters for the instrument were: 1.5° arc, 3 cycles/minute, 0–100 range, 120 minute chart motor, and one minute preheat time. The test temperatures are specified in the tables. Pertinent data from this instrument are: $t_{s2}$ or $t_{s4}$, the minutes for the Rheometer torque curve to rise 2 or 4 units above the minimum torque value, and $t_c(90)$ the minutes required for the torque to reach 90 percent of the difference between the maximum and minimum torque values.

The time, $t_{s2}$ or $t_{s4}$, serves as a measure of scorch delay. The $t_c(90)$ value is considered to be the time required to reach the optimum vulcanized state. The difference, $[t_c(90)-t_{s4}]$ is indicative of the time necessary for actual vulcanization or cure to take place after the scorch delay period has ended, i.e., is a relative measure of vulcanization rate. Scorch inhibitors which increase $t_{s2}$ or $t_{s4}$, but do not greatly increase $[t_c(90)-t_{s4}]$ are preferred since these impart processing safety, yet do not require greatly extended vulcanization times.

$\Delta Rh$ is the difference between the maximum ($M_{HF}$) and minimum ($M_L$) torque obtained on the rheometer curve. It is used as a measure of the degree (state) of vulcanization.

Tensile strength, elongation, and 300 percent modulus were obtained according to standard test procedures wherein dumbbell samples were died from vulcanized sheets and tested in a conventional tensile tester.

Retarders of the present invention were evaluated in Stock A (162.5 parts) using 0.5 part of 2-(4-morpholinothio)-benzothiazole as accelerator.

Table II

| Retarder | Rheometer at 135° C. | | | $\Delta Rh$ |
|---|---|---|---|---|
| | $t_{s4}$ | $t_c(90)$ | $[t_c(90)-t_{s4}]$ | |
| Control | 16.6 | 48.6 | 32.0 | 65.2 |
| 1 | 27.1 | 70.0 | 42.9 | 61.9 |
| 2 | 27.2 | 69.0 | 41.8 | 60.3 |
| 3 | 27.9 | 66.8 | 38.9 | 60.7 |
| 4 | 28.0 | 63.0 | 35.0 | 61.1 |
| 5 | 27.8 | 70.1 | 42.3 | 60.7 |
| 6 | 26.6 | 67.0 | 40.4 | 59.4 |
| 7 | 26.9 | 65.1 | 38.2 | 59.7 |
| 8 | 20.5 | 54.2 | 33.7 | 61.2 |
| 9 | 19.5 | 52.5 | 33.0 | 62.2 |

1) n-propyl-trichloromethyl disulfide
2) n-butyl-trichloromethyl disulfide
3) n-octyl-trichloromethyl disulfide
4) n-dodecyl-trichloromethyl disulfide
5) benzyl-trichloromethyl disulfide
6) phenyl-trichloromethyl disulfide
7) p-chlorophenyl-trichloromethyl disulfide
8) cyclohexyl-trichloromethyl disulfide
9) t-butyl-trichloromethyl disulfide All of the above compounds exhibited a scorch retardency effect ($t_{s4}$ was higher in all cases than the $t_{s4}$ value for the control). The rate of vulcanization was diminished somewhat as indicated by the $[t_c(90)-t_{s4}]$ data. The same was true of the state of vulcanization as indicated by the $\Delta Rh$ values which were generally consistent with modulus values obtained (tensile for 300 percent elongation at $t_c(90)$ and $2[t_c(90)]$). Tensile and elongation values were similar for the control and the systems containing the retarders.

Retarders 1 and 5 were tested in 162.5 parts of Base Stock A using 0.5 part of 2-(4-morpholinothio)-benzothiazole as a primary accelerator with and without a secondary accelerator or activator. The results are listed in Table III.

Table III

| Component (parts) | | | | | | | |
|---|---|---|---|---|---|---|---|
| Diphenyl Guanidine | — | — | 0.1 | — | — | — | 0.2 |
| Selenium Dimethyl-dithiocarbamate | — | — | — | 0.1 | — | — | — |
| Tetramethylthiuram Disulfide | — | — | — | — | 0.1 | — | — |
| Retarder 1 | — | 0.5 | 0.5 | 0.5 | 0.5 | — | — |
| Retarder 5 | — | — | — | — | — | 1.0 | 1.0 |
| Rheometer at 135°C. | | | | | | | |
| $t_{s4}$ | 15.1 | 29.9 | 28.9 | 15.7 | 15.3 | 31.3 | 32.1 |
| $t_c(90)$ | 48.0 | 66.2 | 59.1 | 38.8 | 34.8 | 75.0 | 65.5 |
| $[t_c(90)-t_{s4}]$ | 32.9 | 36.3 | 30.2 | 23.1 | 19.5 | 43.7 | 33.4 |
| $\Delta Rh$ | 67.2 | 62.4 | 64.9 | 72.0 | 71.4 | 61.0 | 65.2 |

Table IV

| Retarder | | | | Test Stock | | | | | |
|---|---|---|---|---|---|---|---|---|---|
| 1 | 2 | 3 | 4 | 5 | 6 | 7 | 8 | 9 | 10 |
| 10 - | .5 | | | | | — | — | — | — |
| 11 - | | .5 | | | | — | — | — | — |
| 12 - | | | .5 | | | | .5 | — | — |
| 13 - | | | | .5 | | — | | — | — |
| 14 - | | | | | .5 | — | — | .5 | 1.0 |
| Rheometer at 135°C. | | | | | | | | | |
| A 58.6 | 60.9 | 61.0 | 59.1 | 56.0 | 62.2 | 59.1 | 62.8 | 62.5 | 62.7 |
| B 17.7 | 23.6 | 24.8 | 27.0 | 28.2 | 27.0 | 24.0 | 28.0 | 29.0 | 29.4 |
| C 58.7 | 68.7 | 76.0 | 82.3 | 85.0 | 84.7 | 54.0 | 61.0 | 64.2 | 70.5 |
| D 37.3 | 38.7 | 43.8 | 47.7 | 48.3 | 49.8 | 25.6 | 26.7 | 28.3 | 34.5 |

10 - 2,9-di(trichloromethyldithio)-p-methane
11 - mixture of 3 and 4-(β-trichloromethyldithioethyl)-trichloromethyldithiocyclohexane
12 - α,α'-di(trichloromethyldithio)-p-xylene
13 - 1,4-di(trichloromethyldithio)butane
14 - 1,8-di(trichloromethyldithio)octane
A - ΔRh
B - $t_{s2}$
C - $t_c(90)$
D - $[t_c(90)-t_{s4}]$ As shown in Table III, where no activator accelerator was used, retarders 1 and 5 increased the $t_{s4}$ value, i.e., improved scorch resistance. However, the undesirable effects of increased vulcanization time, $[t_c(b\ 90)-t_{s4}]$, and decreased vulcanization state, ΔRh, accompanied the improved scorch. By using diphenyl guanidine as an activator, these undesirable effects were substantially eliminated without adversely influencing the improved scorch. Where the dithiocarbamate or thiuram was used as the activator, the scorch resistance was about the same as the control, but the vulcanization time was decreased, and the vulcanization state increased. The tensile and elongation were similar for all the compositions tested and the 300 percent modulus values generally correlated with the ΔRh values.

Table IV illustrates the use of retarders of structural formula II. Test stocks 1-6 were formulated from Base stock A, with 0.50 part of 2-(4-morpholinothio)benzothiazole as the accelerator. Test stocks 7-10 used a modified Base stock A in which 2.5 parts of sulfur were substituted with 0.75 part sulfur and 0.63 part of N,N'-dithiobis(morpholine) as a sulfur donor. In these stocks, 1.35 parts of 2-(4-morpholinothio)-benzothiazole served as the accelerator.

The data in Table IV reveal that the compounds of structural formula II function as retarders with both high and low sulfur systems (see $t_{s2}$).

Stock A was vulcanized using N-cyclohexyl-2-benzothiazole-sulfenamide as the accelerator (0.5 part per 162.5 parts of Base Stock A) without a retarder and with 0.25, 0.50 and 1.0 part of retarder 4. Scorch resistance increased and rate and state of vulcanization decreased slightly as the amount of retarder increased. Tensiles were slightly lower than the control while elongations were similar.

Base Stock A (162.5 parts) was vulcanized with 0.5 part of 2-(4-morpholinodithio)-benzothiazole as accelerator without retarder and with 0.5 and 1.0 part of retarder 4. Scorch resistance improved when the retarder was used although the vulcanization rate was lowered. The retarder only slightly lowered the ΔRh values. Tensile, elongation and 300 percent modulus values were similar.

In the same stock as above, retarder 7 improved scorch resistance and reduced rate and state of vulcanization.

Retarders 6 and 3 (0.50 part) were evaluated in 216 parts of Base Stock B with 1.2 part of N-cyclohexyl-2-benzothiazolesulfenamide. Scorch resistance improved slightly while the rate of vulcanization decreased. The state of vulcanization was only slightly decreased. A more substantial improvement in scorch resistance was obtained when the retarders were used with a 1.0 part:0.75 part::2,2'-dithiobis(benzothiazole):diphenylguanidine system.

Retarder 5 (0.25 and 0.50 part) was used in 169.5 parts of Base Stock C with 0.5 part of N-t.butyl-2-benzothiazolesulfenamide as accelerator and improved scorch resistance.

The above examples are not intended to be limiting but rather illustrative. Compounds within the practice of the present invention other than those described in the examples have been synthesized and tested positively as retarders. Additional rubbers and accelerator systems have also been tested and shown to exhibit improved scorch resistance with the compounds of this invention.

While it is impractical, if not impossible, to test all permutations of retarders, accelerators, and rubbers, it is understood that combinations may be selected wherein little or no scorch inhibition will be achieved. For example, certain SBR, polybutadiene, and nitrile rubber stocks accelerated by 2-(4-morpholinodithio)-benzothiazole are not responsive to retardation. In such instances, other accelerators can be employed [e.g., 2,2'-dithiobis(benzothiazole)-diphenylguanidine for SBR, N-t-butyl-2-benzothiazolesulfenamide for polybutadiene, tetramethylthiuram disulfide for nitrile rubber] in order to obtain scorch improvement with the retarders.

Nonetheless, accelerators which can be used are diaryl guanidines such as diphenylguanidine, or thiazoles including 2-mercaptobenzothiazole, 2,2'-dithiobis(benzothiazole) and more specifically benzothiazyl amino disulfides, such as 2-(morpholinodithio)-benzothiazole, or thiazoles (also sulfenamides), more specifically thiazolesulfenamides, and even more specifically benzothiazolesulfenamides such as 2-(4-morpholinothio)-benzothiazole and N-cyclohexyl-2-benzothiazolesulfenamide. Thiuram sulfides such as tetramethylthiuram monosulfide and disulfide and tetraethylthiuram monosulfide and disulfide may also be used as well as other benzothiazolesulfenamides such as N-(*t*-butyl)-2-benzothiazolesulfenamide.

The retarders of this invention may be used at concentrations of from 0.10 part to 5.0 parts by weight of retarder per 100 parts by weight of rubber and even from 0.05 to 10.0 parts. Preferably the concentration ranges from 0.25 to 5.0 parts, more preferably from 0.25 to 3.0 parts and most preferably from 0.25 to 1.50 parts.

The sulfur and accelerator levels are all well known in the art. For example, sulfur is normally used in a range of from 0.5 to 5.0 parts by weight per 100 parts by weight of rubber.

Various organic accelerators useful within the practice of this invention are described and illustrated in the Vanderbilt Rubber Handbook, 1968 Edition, R. T. Vanderbilt Company, Inc., particularly at pages 242 to 244 and also in the bulletin of the Elastomer Chemicals Dept. of the E. I. Du Pont de Nemours and Co. (inc.) entitled "Accelerators, Vulcanizing Agents and Retarders, Brochure No. SD A54457."

The polymers in which the retarders of the present invention are incorporated remain suitable for their art recognized uses, e.g., in tires and industrial products.

When used with the aforementioned primary accelerators alone, the retarders improve scorch resistance. When used with systems containing secondary accelerators of the thiuram type, they maintain scorch resistance while permitting the thiurams to increase vulcanization rates. When used with accelerator systems containing guanidine secondary accelerators, they improve scorch resistance while permitting vulcanization rates to be maintained.

Certain supplemental rubber additives, which are not an inherent part of the curing system, are well known to increase scorchiness or the tendency toward premature vulcanization. These include amine type antioxidants and antiozonants, pine tar, and components of adhesive systems such as hexamethylenetetramine. Those skilled in the art will recognize that the presence of such additives, acting in opposition, may reduce or, if in sufficient amount, negate the inhibitory effects of the compounds of this invention.

During vulcanization some retarders react to form by-products which tend to bloom, i.e., to form solid deposits on the surface of the vulcanized rubber article in which they are formed.

The present retarders have a high resistance to bloom as do the by-products formed therefrom during vulcanization.

The retarders in Table II were used at a level of 0.5 part by weight.

While certain representative embodiments and details have been shown for the purpose of illustrating the invention, it will be apparent to those skilled in this art that various changes and modifications may be made therein without departing from the spirit or scope of the invention.

What is claimed is:

1. A composition comprising a sulfur vulcanizable diene rubber containing a compound selected from the group consisting of retarders having the following structural formulae $$RSSCCl_3 \quad (I)$$

and $$Cl_3CSSR^1SSCCl_3 \quad (II)$$

wherein R is a radical selected from the group consisting of alkyl (1 to 20 carbon atoms), cycloalkyl (5 to 20 carbon atoms), aralkyl (7 to 20 carbon atoms), aryl (6 to 20 carbon atoms), and alkylaryl (7 to 20 carbon atoms), $R^1$ is selected from the group consisting of unsubstituted and mono archloro substituted xylylene radicals, acyclic divalent hydrocarbon radicals (3 to 20 carbon atoms), and cyclic divalent hydrocarbon radicals (5 to 20 carbon atoms) on which the valencies may or may not be attached to the ring itself, and wherein the valencies on both the acyclic and cyclic radicals are separated by at least one carbon atom.

2. The composition according to claim 1 wherein the rubber contains a vulcanization agent selected from the group consisting of free sulfur and a sulfur donor.

3. The composition according to claim 1 wherein the rubber contains free sulfur.

4. The composition according to claim 1 wherein the diene rubber is selected from the group consisting of natural rubber, polybutadiene, polyisoprene and copolymers of styrene and 1,3-butadiene.

5. The composition according to claim 1 wherein R is selected from the group consisting of alkyl radicals having 2 to 19 carbon atoms, cyclopentyl, cyclohexyl, cyclooctyl, benzyl, o-methylbenzyl, m-methylbenzyl, p-methylbenzyl, o-chlorobenzyl, m-chlorobenzyl, p-chlorobenzyl, o-nitrobenzyl, m-nitrobenzyl, p-nitrobenzyl, o-tolyl, m-tolyl, p-tolyl, phenyl, p-chlorophenyl, and p-nitrophenyl.

6. The composition according to claim 1 wherein R is a primary alkyl radical having the structure —$CH_2$-$R^2$, wherein $R^2$ is a saturated straight chain or branched aliphatic hydrocarbon group of 1 to 18 carbon atoms and $R^1$ is selected from the group consisting of p-xylylene, divalent radicals having the structure —$CH_2$-$R^3$-$CH_2$— wherein $R^3$ is a saturated straight or branched chain aliphatic hydrocarbon group having 1 to 10 carbon atoms, 1,4-cyclohexylene, p-menthanedi-2,9-yl, 2-ethylenecyclohexyl and 4-ethylenecyclohexyl.

7. The composition according to claim 3 wherein the rubber is selected from the group consisting of natural rubber and synthetic cis-1,4 polyisoprene.

8. The composition according to claim 7 wherein the rubber contains 2-(4-morpholinodithio)-benzothiazole.

9. The composition according to claim 7 wherein the rubber contains an accelerator selected from the group consisting of 2-(4-morpholinothio)-benzothiazole, N-tertbutyl-2-benzothiazolesulfenamide, and N-cyclohexyl-2-benzothiazolesulfenamide.

10. The composition according to claim 9 wherein the rubber contains a tetraalkylthiuram disulfide, a diarylguanidine, or a salt of a dialkyldithiocarbamic acid as a secondary accelerator.

11. The composition according to claim 9 wherein the retarder is selected from the group consisting of n-dodecyl-trichloromethyldisulfide and (primary tridecyl)trichloromethyldisulfides.

* * * * *